(12) United States Patent
Wuebbolt-Gorbatenko

(10) Patent No.: US 11,970,221 B2
(45) Date of Patent: Apr. 30, 2024

(54) STEERING ACTUATOR

(71) Applicant: Schaeffler Technologies AG & Co. KG, Herzogenaurach (DE)

(72) Inventor: Benjamin Wuebbolt-Gorbatenko, Erlangen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 300 days.

(21) Appl. No.: 17/440,207

(22) PCT Filed: Mar. 12, 2020

(86) PCT No.: PCT/DE2020/100181
§ 371 (c)(1),
(2) Date: Sep. 17, 2021

(87) PCT Pub. No.: WO2020/200358
PCT Pub. Date: Oct. 8, 2020

(65) Prior Publication Data
US 2022/0161844 A1   May 26, 2022

(30) Foreign Application Priority Data
Mar. 29, 2019 (DE) .................. 10 2019 108 235.8

(51) Int. Cl.
*B62D 5/04* (2006.01)
*F16C 33/06* (2006.01)
*F16C 33/72* (2006.01)

(52) U.S. Cl.
CPC ......... *B62D 5/0451* (2013.01); *B62D 5/0448* (2013.01); *F16C 33/06* (2013.01); *F16C 33/726* (2013.01); *F16C 2326/24* (2013.01)

(58) Field of Classification Search
CPC .................................................. B62D 5/0451
See application file for complete search history.

(56) References Cited

U.S. PATENT DOCUMENTS

| 8,454,029 | B2 | 6/2013 | Michel | |
| 9,995,337 | B2* | 6/2018 | Ikeda | ...................... F16C 35/02 |
| 2002/0085778 | A1 | 7/2002 | Mena | |
| 2008/0088104 | A1* | 4/2008 | Arlt | ......................... F16C 33/20 |
| | | | | 280/93.514 |

FOREIGN PATENT DOCUMENTS

| DE | 19601096 A1 | 7/1997 |
| DE | 102005023250 A1 | 11/2006 |

(Continued)

*Primary Examiner* — Kevin Hurley

(57) ABSTRACT

A steering actuator for rear axle steering of a motor vehicle has a spindle drive (5) which comprises pushrods (9) which are connected to a threaded spindle (16) and which are mounted in a housing (6) by means of plain bearings (18), allowing the passage of air, and are connected at each end thereof to an attachment element (12) provided for coupling to a chassis suspension arm, wherein a gaiter (19, 20) is connected on the one side to the housing (6) and on the other side to one of the attachment elements (12) in each case. Each plain bearing (18) is designed as a bearing allowing one revolution of the threaded spindle (16), wherein at least one longitudinal groove (21) abuts one guide bush (23) of the plain bearing (18).

20 Claims, 4 Drawing Sheets

(56) References Cited

FOREIGN PATENT DOCUMENTS

| DE | 102006052528 A1 |   | 5/2008  |         |
|----|-----------------|---|---------|---------|
| DE | 102009052790 A1 |   | 5/2011  |         |
| DE | 102015206455 A1 | * | 9/2016  | ............... B62D 3/06 |
| DE | 102015219198 A1 |   | 4/2017  |         |
| DE | 102017124388 A1 |   | 1/2019  |         |
| EP |       2202129 B1 | * | 1/2015  | ............... B62D 3/12 |
| EP |       3168115 A1 |   | 5/2017  |         |
| JP |       2019077235 A | * | 5/2019  | ............... B62D 3/12 |
| WO |       2009133064 A1 |   | 11/2009 |         |
| WO |       2017211463 A1 |   | 12/2017 |         |

\* cited by examiner

STEERING ACTUATOR

CROSS-REFERENCE TO RELATED APPLICATIONS

This application is the U.S. National Phase of PCT Appln. No. PCT/DE2020/100181 filed Mar. 12, 2020, which claims priority to DE 10 2019 108 235.8 filed Mar. 29, 2019, the entire disclosures of which are incorporated by reference herein.

TECHNICAL FIELD

The disclosure relates to a steering actuator suitable for use in rear axle steering of a motor vehicle.

BACKGROUND

Such a steering actuator is known, e.g., from DE 10 2015 219 198 B4. The known steering actuator comprises a spindle drive, the spindle of which has a plain bearing section designed as a polygonal profile. Ventilation channels are formed in corner regions of the polygonal profile between the spindle and a plain bearing element on the housing side, which allow a passage of air between a space delimited by a gaiter and a further hollow space. The steering actuator according to DE 10 2015 219 198 B4 can act either on one side or on two sides. In both cases, the spindle drive of the known steering actuator comprises a movement thread in the form of a trapezoidal thread.

An actuator known from U.S. Pat. No. 8,454,029 B2 for adjusting the level of a chassis of a motor vehicle comprises an equalization volume which allows air displaced during the adjustment process to be received.

A gaiter disclosed in DE 10 2006 052 528 A1 should be designed in such a way that the same volumes are enclosed in the maximally retracted and maximally extended position thereof.

A linear drive is known from WO 2017/211463 A1 which comprises a spindle nut rotatably mounted in an end shield and a displaceable spindle, wherein the spindle is sealed off by two gaiters from a housing in which the end shield is located. In the end shield there is an air duct through which air can flow between the spaces enclosed by the gaiter when the linear drive is actuated.

In DE 10 2009 052 790 A1, components of a disc brake for a commercial vehicle are described. A gaiter, through which an encapsulated space is formed, is attached to a guide bar. Air trapped in the space can flow through a sliding bearing of the guide bar, wherein longitudinal grooves are formed in the bearing components for this purpose.

SUMMARY

It is desirable to specify a steering actuator which has been further developed compared to the cited prior art and which allows a passage of air through a sliding bearing, wherein at the same time a construction that is advantageous in terms of production technology is provided.

A steering actuator, which is suitable for rear axle steering of a motor vehicle includes a spindle drive, i.e., a rotary-linear transmission. Here, the threaded spindle of the spindle drive is connected to pushrods or is designed in one piece. The pushrods are mounted in a housing by means of plain bearings, allowing the passage of air, and are connected at the ends thereof to an attachment element provided for coupling to a chassis suspension arm, wherein a gaiter is connected on the one side to the housing and on the other side to one of the attachment elements.

Each plain bearing is designed as a bearing that allows one revolution of the threaded spindle, wherein at least one longitudinal groove abuts a guide bush of the plain bearing, which represents a free flow cross-section. Longitudinal grooves can be designed on the inner circumferential surface and/or the outer circumferential surface of the guide bush. In the latter case, a longitudinal groove, i.e., a groove running in the axial direction of the plain bearing, can be formed in the guide bush or in a surrounding component that receives the guide bush.

If the free flow cross-sections are designed on the inner circumferential surface of the guide bush and thus interrupt the sliding surface, there is preferably a plurality of longitudinal grooves, in particular at least three and at most twelve longitudinal grooves, for example four longitudinal grooves, which are distributed over the circumference of the plain bearing, in particular in an equidistant arrangement. Here, the longitudinal grooves on the circumference of the sliding surface extend over a total angle which, in a preferred embodiment, is at least 30° and at most 150°. This condition is fulfilled, for example, if the diameter of the sliding surface is 18 mm, corresponding to a circumference of 56.5 mm, wherein the sliding surface is interrupted by four longitudinal grooves, each being 4 mm wide, corresponding to an angle of 25.5° on the circumference of the sliding surface. The total angle that the longitudinal grooves occupy on the circumference of the sliding surface is approx. 102° in this case.

As far as the depth of the longitudinal grooves to be measured in the radial direction of the threaded spindle is concerned, there are no fundamental restrictions. In typical designs, the depth of each longitudinal groove to be measured in the radial direction of the threaded spindle is less than the width of the longitudinal groove to be measured in the circumferential direction of the sliding surface. The individual longitudinal grooves are profiled to be, for example, curved, in particular in the form of an elliptical, for example circular, curvature, or angular, in particular rectangular or trapezoidal.

The rotational lock of the spindle is decoupled from the sliding bearing, in which at least one ventilation channel is integrated in the form of a longitudinal groove. A particularly simple, process-reliable assembly of the plain bearing is possible due to the separate rotational lock of the spindle.

The longitudinal grooves, which are distributed on the circumference of the sliding surface or on the outer circumferential surface of the guide bush, wherein in which case the geometrical relationships mentioned can apply accordingly, do not necessarily run exactly in the axial direction of the sliding bearing. Rather, the function of the longitudinal grooves can also be taken over, for example, by helically wound grooves, as long as a free flow cross-section is formed between the two end faces of the plain bearing.

Irrespective of the number and shape of the longitudinal grooves, if they border on the sliding surface, they preferably extend in the axial direction of the spindle drive beyond the sliding surface to promote a further flow of air with little flow resistance.

According to one possible development, each gaiter of the steering actuator has a pressure compensation element. If such a pressure compensation element is present, no passage of air is required through the plain bearing adjacent to the corresponding gaiter.

The spindle drive of the steering actuator is designed, for example, as a planetary roller drive or as a ball screw drive.

With regard to possible types of such transmissions, reference is made, for example, to documents DE 10 2017 124 388 A1, which relates to planetary roller drives, and WO 2009/133064 A1, which relates to ball screw drives.

BRIEF DESCRIPTION OF THE DRAWINGS

In the following, several exemplary embodiments are explained in more detail by means of a drawing. In the figures.

DETAILED DESCRIPTION

Figure 1:
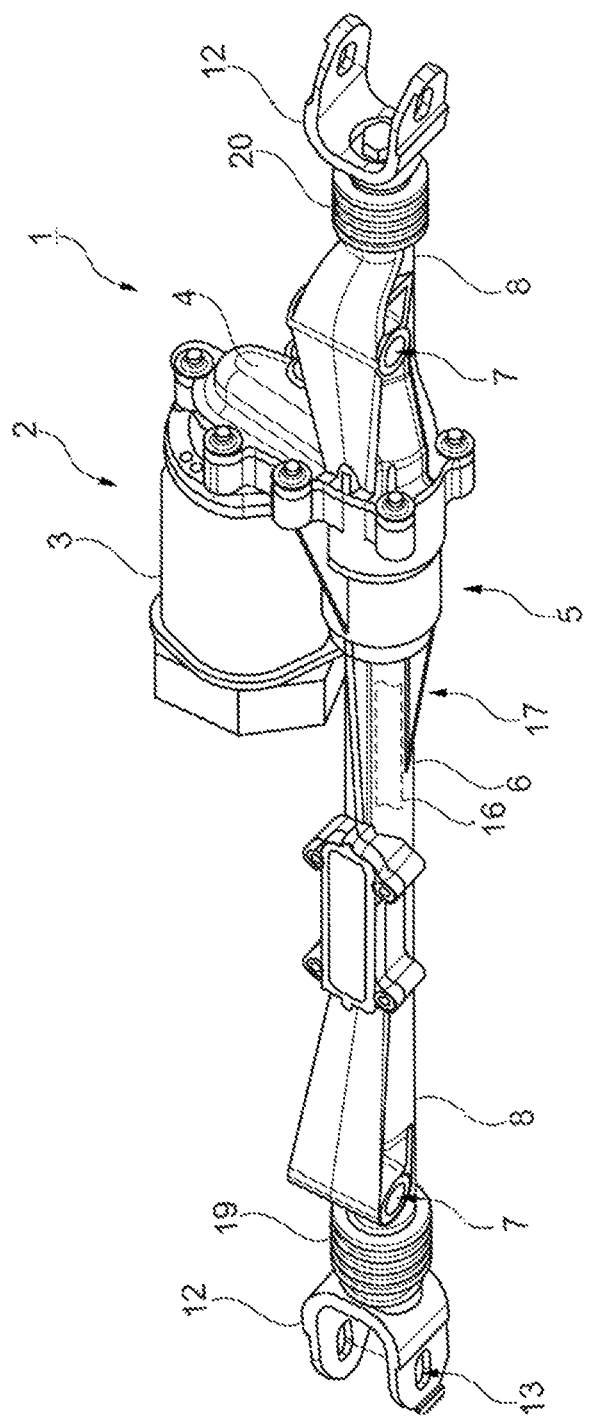
FIG. 1 shows a first exemplary embodiment of rear axle steering of a motor vehicle in an overview representation.

Unless otherwise stated, the following explanations relate to all exemplary embodiments. Parts that correspond to each other or have basically the same effect are marked with the same reference symbols in all figures.

Rear axle steering, identified as a whole by the reference numeral 1, is intended for installation in a chassis of a motor vehicle, which is not shown in any further detail. The rear axle steering 1 comprises a steering actuator 2, which is also referred to for short as an actuator and has an electric motor 3 and two transmissions 4, 5 connected in series. The transmission 4 converts the rotation of the shaft of the electric motor 3 into a rotation of a further element within the actuator 2. In the present cases, the transmission 4, i.e., rotary-rotary transmission, is a continuously variable transmission in the form of a belt drive. The transmission 5 connected downstream of the rotary-rotary transmission 4 is designed as a rotary-linear transmission, namely a screw drive. In the exemplary embodiments, a ball screw drive is used as the spindle drive as the rotary-linear transmission 5.

Figure 2:
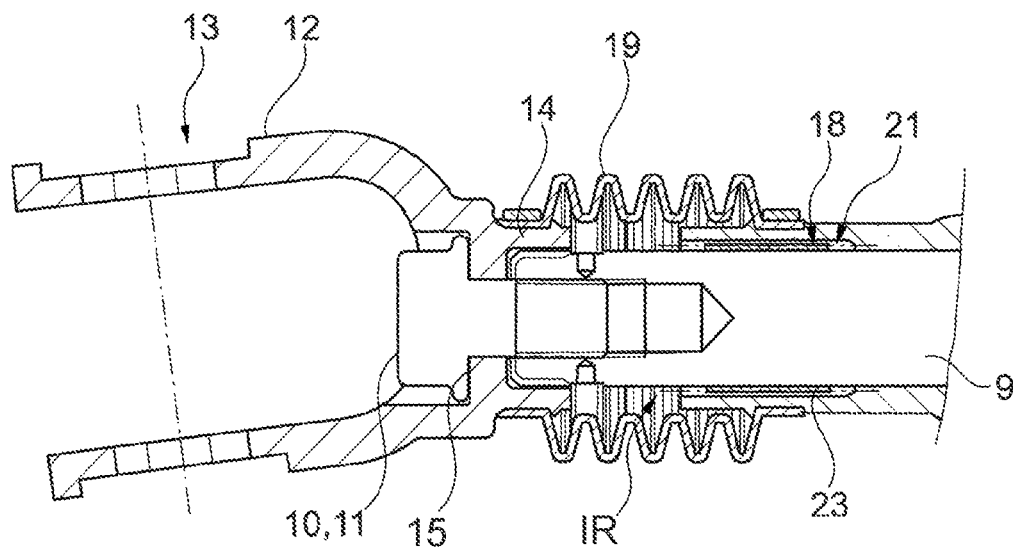
FIG. 2 shows a detail of further rear axle steering in a sectional view.

On the output side of the spindle drive 5 there is a pushrod 9 which is only partially visible in FIG. 2 and which in all the exemplary embodiments is displaceably mounted in a guide section 8. The guide section 8 is part of a housing 6 of the rear axle steering 1. The housing 6 is to be connected to a vehicle body. Fastening contours of the housing 6 provided for this purpose are denoted by 7 in FIG. 1.

The pushrod 9, which in typical applications is suitable both for the transmission of tensile forces and for the transmission of compressive forces, is firmly connected to a fork 12 by means of a screw 10. The fork 12 is generally also referred to as an attachment element and is used for the articulated connection to a chassis suspension arm (not shown). A bolt (also not shown) can be pushed through openings 13 in fork 12.

Each pushrod 9 is fixedly connected to a threaded spindle 16, only indicated in FIG. 1, or made in one piece therewith. A rotation of the threaded spindle 16 in the housing 6 is prevented by a rotational lock 17, which is located inside the housing 6.

Overall, the fork 12 has a shape that tapers towards the pushrod 9. In this case, an annular section 14 is pushed onto the pushrod 9, wherein rotational lock contours that are not shown and which are not identical to the aforementioned rotational lock 17 can be designed on the annular section 14 and on the pushrod 9. A radially inwardly directed flange 15 of the fork 12 abuts the annular section 14 and rests on the front side of the pushrod 9. The head, denoted by 11, of the screw 10 which is screwed into the pushrod 9, rests on the second end face of the flange 15.

The pushrod 9 is mounted at the end of the guide section 8 by means of a plain bearing 18. A gaiter 19, 20 bridges the variable distance between the fork 12 and the housing 6. An interior space IR of variable size is enclosed by each gaiter 19, 20. The total volume of both interior spaces IR is constant. To allow the flow of air between the two interior spaces IR, channels 21 in the form of longitudinal grooves are integrated into each plain bearing 18.

Figure 6:
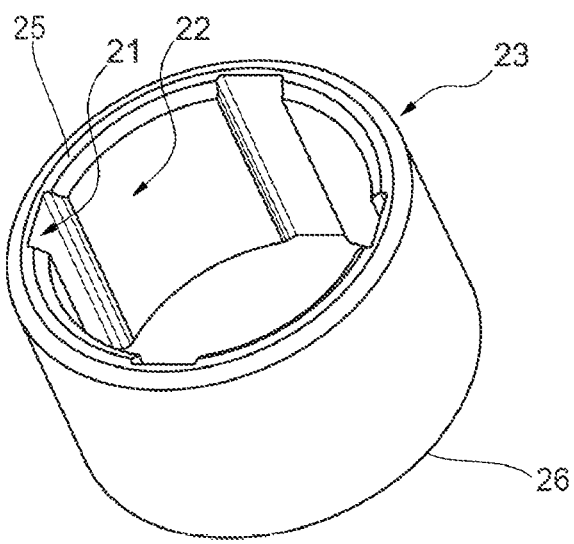
FIG. 6 shows an alternative embodiment of a plain bearing component for rear axle steering.
Figure 7:
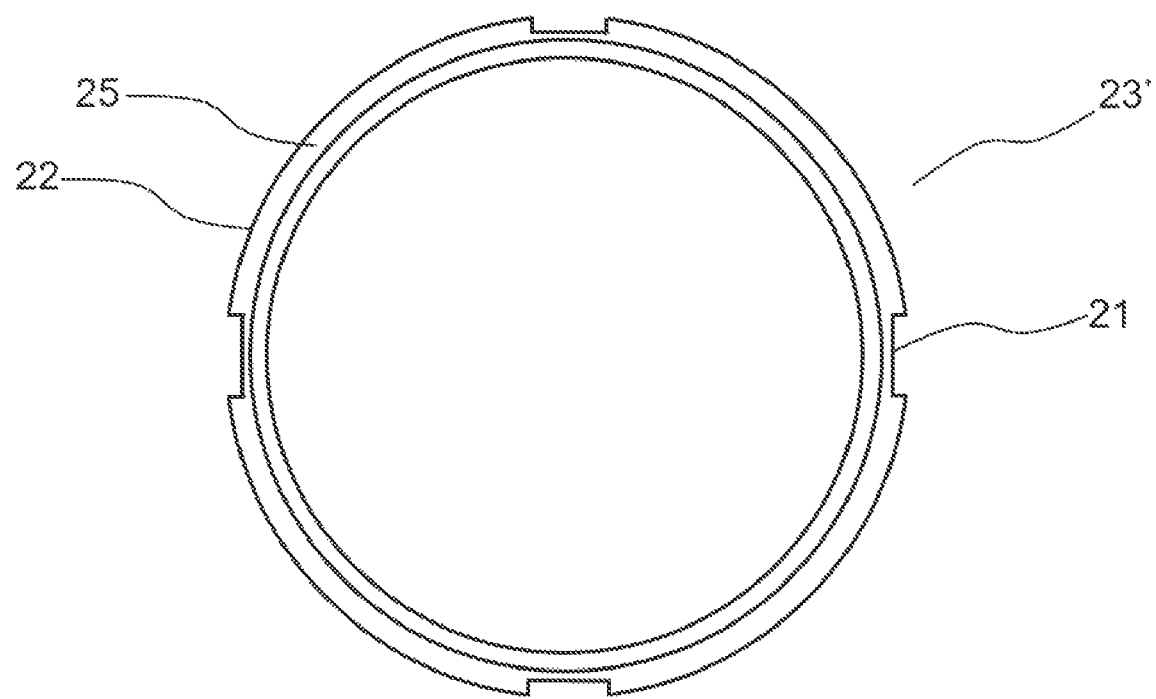
FIG. 7 shows an end view of an example embodiment of a plain bearing component for rear axle steering.

In the exemplary embodiments according to FIGS. 1 and 2, as in the exemplary embodiments according to FIGS. 6 and 7, a wall surface designated by 22 is interrupted by the longitudinal grooves 21. In the case of FIG. 6, the wall surface 22 is a sliding surface of a guide bush 23. In the case of FIG. 7, the wall surface 22 is an outer circumferential surface of a guide bush 23'. In contrast, in the case of FIG. 1 and in the case of FIG. 2, the wall surface 22 is provided by the housing 6, wherein the guide bush 23 is received in the wall surface 22 by a press fit.

In all of the exemplary embodiments, four longitudinal grooves 21 are uniformly distributed, i.e., at 90-degree intervals, on the circumference of the wall surface 22, in particular the sliding surface. The longitudinal grooves 21 running in the longitudinal direction of the spindle drive 5 protrude beyond the guide bush 23 on both end faces to allow an unimpeded passage of air between the interior spaces IR in the gaiters 19, 20 and the non-variable interior space within the housing 6. In the exemplary embodiments of FIGS. 6 and 7, each one of the longitudinal grooves 21 extend continuously from a first axial end 25 to a second axial end 26 so that air can pass through the respective guide bushes 23, 23'.

The exemplary embodiment according to FIG. 1, like the exemplary embodiment according to FIG. 2, differs from the exemplary embodiment according to FIGS. 6 and 7 in that the longitudinal grooves 21 are designed on the outer circumferential surface of the guide bush 23 by being molded into an inner circumferential surface of the housing 6. In this case, the guide bush 23 has continuously smooth, uninterrupted inner and outer circumferential surfaces with a circular-cylindrical cross-section.

Figure 3:
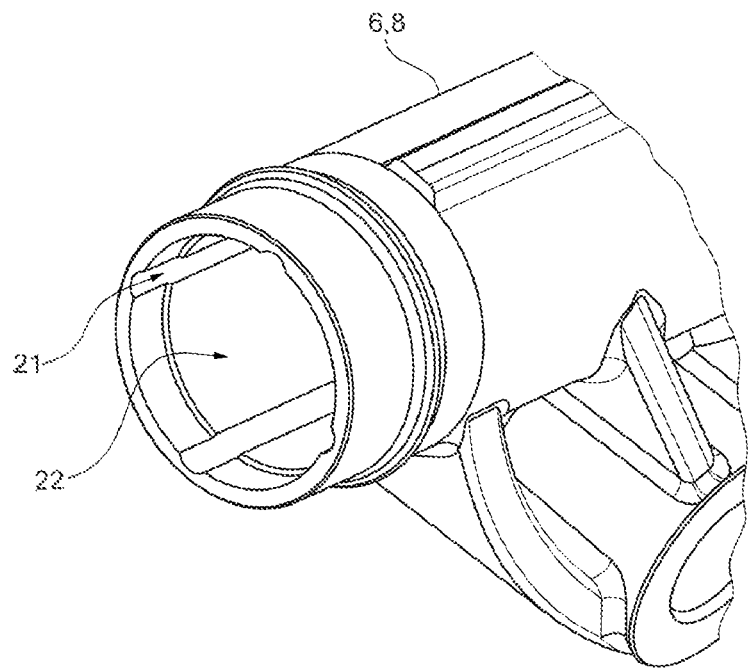
FIG. 3 shows a housing of the rear axle steering according to FIG. 1 in a perspective view.
Figure 4:
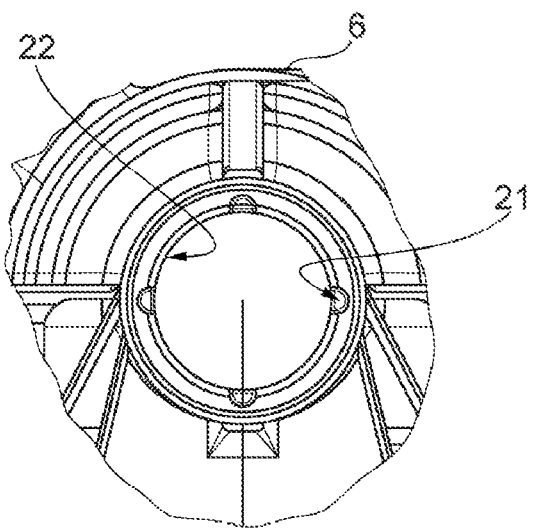
FIG. 4 shows the housing according to FIG. 3 in an end view.

In the exemplary embodiments according to FIGS. 1 and 2, the longitudinal grooves 21 each describe a curved profile. Here, as can be seen in detail from FIGS. 3 and 4, there is a concave curvature of the surface, i.e., of the press fit for the guide bush 23 (not shown here).

In contrast thereto, the longitudinal grooves 21 in the exemplary embodiments according to FIGS. 6 and 7 describe an angular, approximately rectangular profile. In both cases, the guide bush 23 does not provide any guidance function with respect to the pushrod 9 in the circumferential direction. This means that the pushrod 9 is freely rotatable within the guide bush 23 and is only prevented from a rotation by the rotational lock 17. When assembling the steering actuator 2, the angular relationship between the guide bush 23 and the pushrod 9 is therefore irrelevant.

Figure 5:
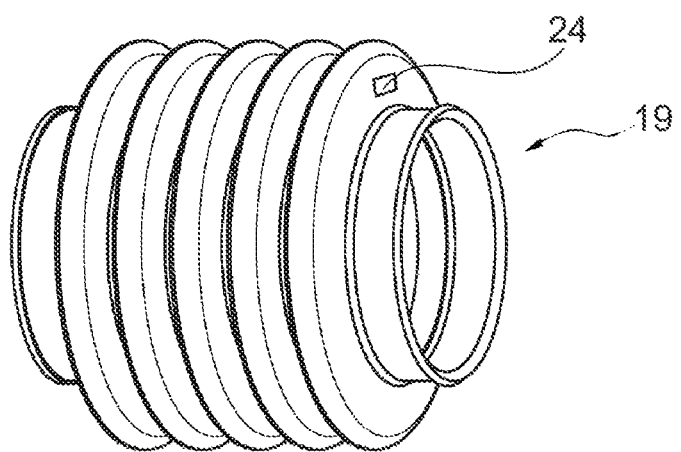
FIG. 5 shows a gaiter for rear axle steering.

FIG. 5 shows a further developed gaiter 19, which can be combined with each of the embodiments of the steering actuator 2 explained above. The gaiter 19 according to FIG. 5 comprises a pressure compensation element 24, which allows air to be introduced directly into the interior space IR or air to be discharged from the interior space IR. The function of longitudinal grooves 21 can be replaced or supplemented by the pressure compensation element 24.

LIST OF REFERENCE SYMBOLS

1 Rear axle steering
2 Steering actuator
3 Electric motor
4 Continuously variable transmission, rotary-rotary transmission
5 Spindle drive, rotary-linear transmission
6 Housing
7 Fixing contour
8 Guide section
9 Pushrod
10 Screw
11 Head
12 Fork, attachment element
13 Opening
14 Annular section
15 Flange
16 Threaded spindle
17 Rotational lock
18 Plain bearing
19 Gaiter
20 Gaiter
21 Channel, longitudinal groove
22 Wall surface, sliding surface, press fit
23 Guide bush
23' Guide bush
24 Pressure compensation element
25 First axial end
26 Second axial end
IR Interior space

The invention claimed is:

1. A steering actuator for rear axle steering of a motor vehicle, having a spindle drive which comprises pushrods which are connected to a threaded spindle and which are mounted in a housing by means of plain bearings, allowing passage of air, and are connected at ends thereof to an attachment element provided for coupling to a chassis suspension arm, a gaiter being connected on one side to the housing and on another side to one of the attachment elements in each case, wherein at least one of the plain bearings allows one revolution of the threaded spindle, and wherein at least one longitudinal groove abuts a guide bush of the at least one of the plain bearings.

2. The steering actuator according to claim 1, wherein the at least one longitudinal groove is arranged on an outer circumferential surface of the guide bush, the at least one longitudinal groove extending continuously from a first axial end of the guide bush to a second axial end of the guide bush.

3. The steering actuator according to claim 2, wherein the outer circumferential surface forms a press fit with the housing.

4. The steering actuator according to claim 3, wherein a second one of the at least one longitudinal groove extends across another one of the at least one of the respective plain bearings.

5. The steering actuator according to claim 1, wherein press fit between the guide bush and the housing is interrupted by the at least one longitudinal groove.

6. The steering actuator according to claim 5, wherein the at least one longitudinal groove extends in a longitudinal direction beyond the guide bush.

7. The steering actuator according to claim 1, wherein the at least one longitudinal groove comprises between three and twelve longitudinal grooves distributed over the circumference of the at least one of the plain bearings.

8. The steering actuator according to claim 7, wherein the at least one longitudinal groove extends over a total angle of at least 30° and at most 150°.

9. The steering actuator according to claim 1, wherein the at least one longitudinal groove has a curved profile.

10. The steering actuator according to claim 1, wherein the at least one longitudinal groove is rectangular in profile.

11. The steering actuator according to claim 1, wherein a depth of each groove of the at least one longitudinal groove in a radial direction of the threaded spindle is less than a width of each groove of the at least one longitudinal groove in a circumferential direction of each groove of the at least one longitudinal groove.

12. The steering actuator according to claim 1, wherein the gaiter has a pressure compensation element.

13. The steering actuator according to claim 1, wherein the guide bush does not have longitudinally extending grooves on either of an inner circumferential surface or an outer circumferential surface.

14. The steering actuator according to claim 1, wherein the at least one longitudinal groove is arranged on an outer circumferential surface of the guide bush, and the outer circumferential surface is press-fit to the housing.

15. The steering actuator according to claim 1, wherein the guide bush is fixed to the housing via a press fit.

16. A steering actuator comprising:
a housing;
two pushrods connected to a threaded spindle and supported by with respect to the housing by respective plain bearings for axial movement within the housing;
two forks each connected to a respective pushrod for axial movement therewith; and
two gaiters, each connected to a respective fork and to the housing to define two respective interior spaces which each vary in volume in response to axial movement of the threaded spindle and the pushrods; and
an inner surface of the housing comprises at least one longitudinal groove configured to permit air to move past at least one of two respective plain bearings.

17. The steering actuator according to claim 16, wherein a sum of the volumes of the two respective interior spaces does not vary in response to axial movement of the threaded spindle and the pushrods.

18. The steering actuator according to claim 16, wherein the at least one of the respective plain bearings has continuously smooth and uninterrupted inner and outer circumferential surfaces.

19. The steering actuator according to claim 16, wherein a first one of the at least one longitudinal groove extends across the at least one of the respective plain bearings.

20. A Steering actuator comprising,
a housing;
two pushrods connected to a threaded spindle and supported by with respect to the housing by respective plain bearings for axial movement within the housing,
two forks each connected to a respective pushrod for axial movement therewith; and
two gaiters, each connected to a respective fork and to the housing to define two respective interior spaces which each vary in volume in response to axial movement of the threaded spindle and the pushrods, and at least one of the two gaiters has a pressure compensation element.

\* \* \* \* \*